United States Patent [19]
Ambs et al.

[11] Patent Number: 5,746,796
[45] Date of Patent: May 5, 1998

[54] AIR FILTRATION APPARATUS AND FILTER CARTRIDGE RETAINING MEANS THEREFOR

[75] Inventors: Richard W. Ambs, Williamsport; Mary C. Reiner, Hughesville; Howard E. Stugard, Muncy; John W. Pfeiffer, Hughesville, all of Pa.

[73] Assignee: The Young Industries, Inc., Muncy, Pa.

[21] Appl. No.: 787,585

[22] Filed: Jan. 22, 1997

[51] Int. Cl.$^6$ ............................................. B01D 46/42
[52] U.S. Cl. ............................ 55/493; 55/480; 55/481
[58] Field of Search ........................... 55/480, 481, 490, 55/493, 498; 406/85

[56] References Cited

U.S. PATENT DOCUMENTS

| | | | |
|---|---|---|---|
| 2,336,765 | 12/1943 | Adams | 55/481 |
| 4,021,212 | 5/1977 | Legler | 55/480 |
| 4,560,396 | 12/1985 | O'Dell | 55/493 |
| 4,889,452 | 12/1989 | Heyl | 406/85 |

FOREIGN PATENT DOCUMENTS

| | | | |
|---|---|---|---|
| 1254155 | 5/1989 | Canada | 55/493 |
| 1543310 | 4/1979 | United Kingdom | 55/493 |

*Primary Examiner*—Jay H. Woo
*Assistant Examiner*—Minh-Chau T. Pham
*Attorney, Agent, or Firm*—Lalos & Keegan

[57] ABSTRACT

A filter apparatus generally including a housing defining an air plenum having an inlet and at least one outlet, a filter member having an outlet, disposable within the air plenum in a preoperative position with the outlet thereof in registry with the housing outlet, means selectively operable when the filter member is in the preoperative position for displacing the filter member into an operative position with the filter member outlet communicating with the housing outlet and the filter member in sealing engagement with the housing about the housing outlet, and means for producing an airflow from the housing inlet and through the filter member and the housing outlet whereby airborne particles entrained in airflow drawn through the housing inlet are caused to be removed by the filter member.

30 Claims, 2 Drawing Sheets

AIR FILTRATION APPARATUS AND FILTER CARTRIDGE RETAINING MEANS THEREFOR

This invention relates to the handling of particulate material and more particularly to an apparatus for filtering airborne particles from an air stream. This invention further contemplates a novel arrangement for retaining a filter cartridge in such an apparatus and further for readily inserting and removing such cartridge into and out of such apparatus.

BACKGROUND OF THE INVENTION

In industrial and commercial type filtering equipment, there typically is provided a housing providing an unfiltered air plenum having an inlet and at least one outlet, one or more filter elements, often cartridges, each disposed in the unfiltered air plenum and having an outlet communicating with an outlet of the unfiltered air plenum and means for drawing an air stream from the unfiltered air plenum, through the filter elements and into a clear air plenum from which the filtered air is exhausted into the atmosphere. A general example of such an apparatus is illustrated and described in U.S. Pat. No. 4,889,452 which is incorporated herein by reference. Another example of such an apparatus is a bag dump type of filter apparatus manufactured by The Young Industries, Inc. of Muncy, Pa., utilizing vertically disposed, cartridge type filter elements, sold under the trademark ATMOSCLEAR.

In filter equipment of the type described, utilizing vertical cartridge type filter elements, there typically is provided a horizontally disposed tube sheet separating the unfiltered air plenum from the clear air plenum, to which the filter elements are detachably secured in a depending manner. The cartridges are secured to the tube sheet by a variety of means including cams, clamps, threaded devices and the like which require manual manipulation to install and remove such filter elements.

As filtered airborne particles become lodged on the cartridge exterior surfaces, pulsating jets of compressed air are injected sequentially into such cartridges to dislodge such particles and thus restore the filtering capacity of the cartridges. Periodically, because of wear or damage of the filtering media of such cartridges, they must be removed and replaced. Such changeout requires the equipment to be taken out of service, the cartridges removed by reaching into the unfiltered air plenum, manually disengaging the cartridge attaching devices and manipulating the cartridges out through the unfiltered air plenum inlet or a rear access door, and thereafter inserting and positioning the replacement cartridges in the unfiltered air chamber while attaching the cartridges to the tube sheet. Such cartridge initial installation and replacement procedures can be awkward and difficult to perform and time consuming. It thus has been found to be desirable to provide a filter apparatus of the type described in which the filter cartridges may be easily and quickly installed, firmly retained in position during operation of the apparatus and easily and quickly removed and replaced upon wear or damage to the filter media of the cartridges.

SUMMARY OF THE INVENTION

The present invention generally provides for a filter apparatus generally comprising a housing defining an unfiltered air plenum having an inlet and at least one outlet, a filter member having an outlet, disposable within the unfiltered air chamber in a preoperative position with the outlet thereof in registry with the housing outlet, means selectively operable when the filter member is in the preoperative position for displacing the filter member into an operative position with the filter member outlet communicating with the housing outlet and the filter member in sealing engagement with the housing about the housing outlet, and means for producing an airflow from the housing inlet and through the filter member and the housing outlet whereby airborne particles entrained in airflow drawn through the housing inlet are caused to be removed by the filter member. The selectively operable means for displacing the filter member from the preoperative position to the operative position comprises rotatable means on which the filter member may be seated in the preoperative position, having a cam surface or eccentric portion with cartridge positioning rod pins engageable with an end surface of said filter member operable upon rotation of such rotatable means to displace the filter member from the preoperative position to the operative position. Preferably, the housing in which the filter member is installed is provided with a guide surface engageable by the filter member when disposed in the preoperative position to align the outlet of the filter member with the outlet of the housing defining the unfiltered air plenum, and the cam or eccentric portion with cartridge positioning rod pins of the rotatable means operable to displace the filter member from the preoperative to operative position includes a lip segment which is adapted to engage the filter member when in the operative position to prevent a lateral displacement of the filter member.

DESCRIPTION OF THE DRAWINGS

FIG. 3b is a view similar to the view shown in FIG. 3a, illustrating the filter cartridge in a preoperative position sequential to the filter cartridge position shown in FIG. 3a;

FIG. 4b is a view similar to the view shown in FIG. 4a, illustrating the filter cartridge in a preoperative position sequential to the filter cartridge position shown in FIG. 4a;

FIG. 4c is a view similar to the views shown in FIGS. 4a and 4b, illustrating the filter cartridge in an operative position sequential relative to the filter cartridge position shown in FIG. 4a.

DESCRIPTION OF PREFERRED EMBODIMENTS OF THE INVENTION

Figure 1:
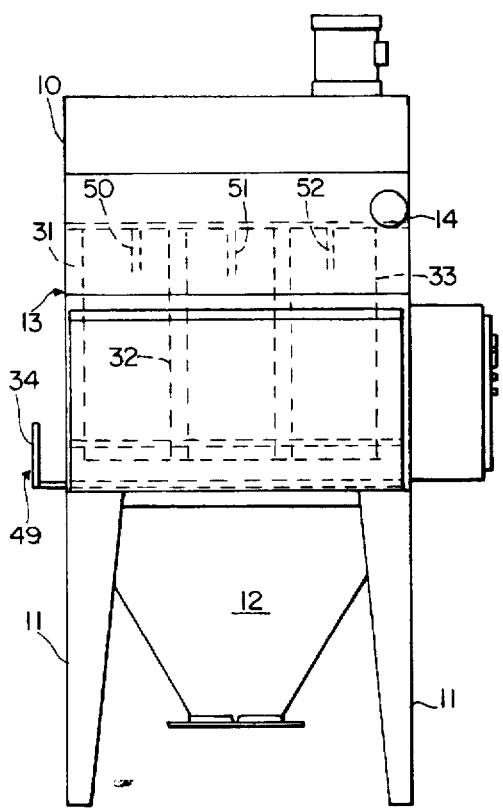
FIG. 1 of the drawings is a front elevational view of a bag dump type unit embodying the present invention.
Figure 2:
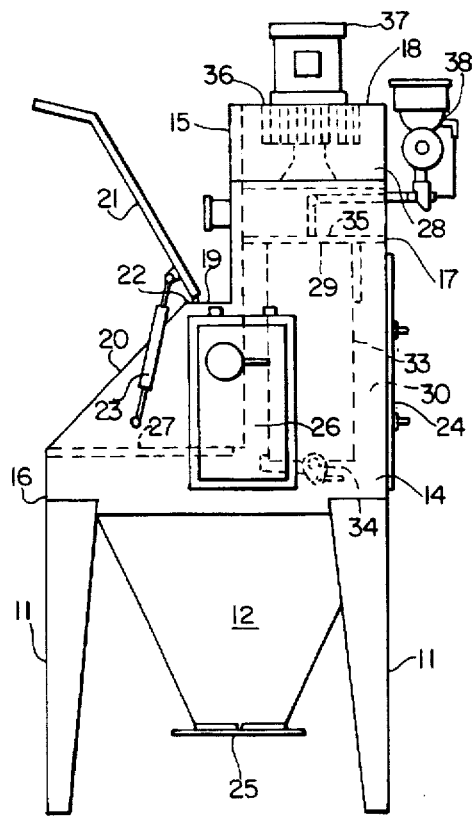
FIG. 2 is a side elevational view of the unit shown in FIG. 1, illustrating the charging door thereof in an open position.

Referring to FIGS. 1 and 2 of the drawings, there is illustrated a bag dump type apparatus which is adapted to receive bags of particulate material which may be ruptured to cause the contents thereof to flow out of the ruptured bags and through the apparatus, and be discharged into a pneumatic conveying line operatively connected to the lower end of the apparatus. The apparatus includes an upper section 10 supported on a set of legs 11 and a lower hopper section 12 depending from upper section 10. Upper section 10 includes a pair of substantially L-shaped side walls 13 and 14, upper and lower front wall portions 15 and 16, a rear wall 17 and upper wall portions 18 and 19. The forwardly disposed portions of side walls 13 and 14, lower front portion 16 and lower upper wall 19 cooperate to provide a charging opening 20 which is adapted to be closed by a charging door 21 hinged to the lower upper wall portion 19, as at 22. The charging door may be retained in the opened position as shown in FIG. 2 by means of a conventional type of a yieldable restraining device 23. Rear wall 17 optionally is provided with an access opening closed by a removable access panel or door 24.

Hopper section 12 is secured at its upper end to upper section 10 and is provided with a bottom discharge opening 25 which may be connected to a pneumatic conveying line for transporting particulate material charged into the apparatus to a remote location for further handling, processing or storage. The section is adapted to receive particulate material gravity fed from the upper section and guided downwardly along its converging walls to the outlet thereof where it is drawn into the pneumatic conveying line.

Vertically aligned and depending from upper wall portion 15 is a panel member 26 which is hinged or otherwise attached to lower upper portion 19 and disposed between side walls 13 and 14 so that it may be swung out through charging opening 20 to provide access to the rearward end of upper section 10. Also disposed between the side walls and extending from lower front wall portion 16 to the lower end of panel 26 is a rigidly mounted grate 27 onto which bags of particulate material may be placed and ruptured to deposit the contents thereof into the apparatus to be fed through upper section 10 and lower hopper section 12 into the pneumatic conveying line.

The upper end of section 10 further is provided with a first partition wall 28 spaced below upper wall portion 18 and a second partition wall or tube sheet 29 spaced below partition wall 28. Tube sheet 29 cooperates with portions of side walls 13 and 14, rear wall 17, upper front wall portion 15 and panel 26 to provide an unfiltered air plenum 30 communicating at its lower end with the lower front end portion of section 10 and lower hopper section 12. A set of filter cartridges 31, 32 and 33 are adapted to be installed in the unfiltered air plenum, seated at their lower ends on a retainer mechanism 34 and having their upper ends urged into sealing relation with tube sheet 29 with upper outlets thereof communicating with openings in the tube sheet.

Partition wall 28 cooperates with tube sheet 29, portions of side walls 13 and 14, a portion of rear wall 17 and upper front wall portion 15 to provide a clean air plenum 35 communicating through the openings in tube sheet 29 with the interiors of filter cartridges 31, 32 and 33. Partition wall 28 further cooperates with upper wall portion 18, portions of side walls 13 and 14, a portion of rear wall 17 and upper front wall portion 15 to provide an air discharge plenum 36 which is provided with an opening communicating with the atmosphere. Alternatively, plenum 36 may communicate with an inlet of a secondary filter unit mounted on upper wall 18, having an outlet communicating with the atmosphere.

Mounted on upper wall portion 18 is a motor having a shaft extending downwardly into air plenum 36, on which there is mounted an impeller having an inlet communicating through an opening in partition 28 with clean air plenum 35 and an outlet communicating with air plenum 36. It will be appreciated that upon operation of motor 37, air will be drawn from the atmosphere through charging opening 20, the lower portion of section 10, unfiltered air chamber 30, filter cartridges 31, 32 and 33, clean air chamber 35 and air plenum 36, and be discharged into the atmosphere.

Mounted in clean air plenum 35 is a plurality of nozzles each directed axially through an opening in the tube sheet and the interior of a filter cartridge for injecting pulses of high pressure air therein to provide a pneumatic shock wave within the filter media of the cartridge, causing it to flex and thus discharge filtered material deposited thereon. Such nozzles are periodically supplied with compressed air through a manifold and supply lines provided with suitable valves controlled by a solid state timer which progressively actuates such valves to introduce pulses of high pressure air through the nozzles.

In the operation of the apparatus as described, with the charging door opened as shown in FIG. 2, suitable controls are operated to start motor 37 and thus cause an airflow from charging opening 20, through the apparatus as described. Bags of particulate material to be processed through the apparatus are manually placed within the upper section onto grate 27 and ruptured, causing the contents of the bag to gravity flow through the grate and downwardly through the lower hopper section into the pneumatic conveying line. Airborne particles emanating from the ruptured bag will be caused to be entrained in the airflow drawn through charging opening 20, and be deposited on the filter media of filter cartridges 31, 32 and 33 as the airstream is caused to pass through the filter cartridges. Clean air flowing through the cartridges, clean air plenum 35 and plenum 36 or a secondary filter unit will be caused to be discharged into the atmosphere. Periodically, pulses of high pressure air are injected through the openings in the tube sheet to provide pneumatic shock waves through the filter cartridges, causing filtered material deposited thereon to dislodge and fall into the hopper section to be carried away by the pneumatic conveying line. Under such circumstances, airborne particles emanating from the material charged into the apparatus will be prevented from entering and polluting the atmosphere, only clean air will be discharged into the atmosphere and all of the material being deposited into the apparatus will be recovered and transported for further handling, processing or storage.

Figure 5:
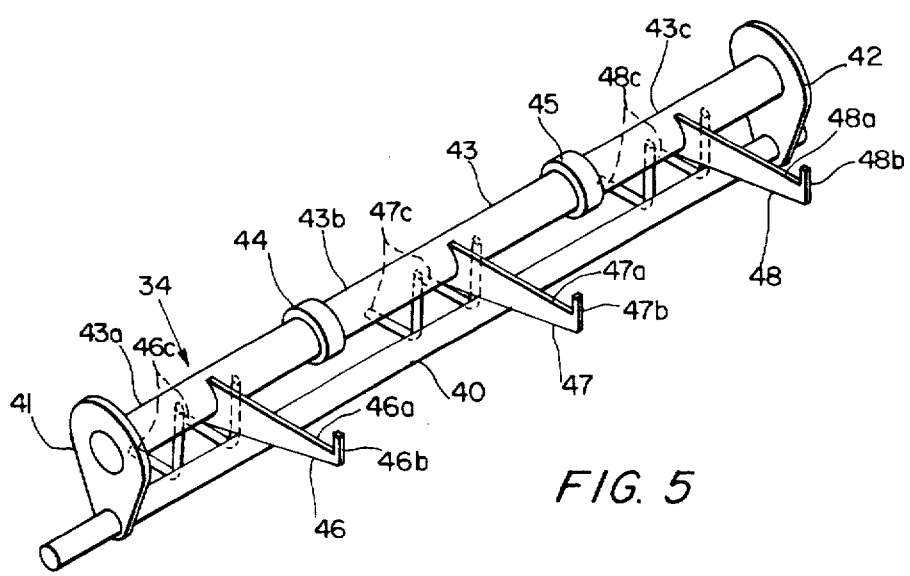
FIG. 5 is an enlarged, perspective view of the mechanism provided in the unit shown in FIGS. 1 and 2 and the aforementioned modification thereof for seating a set of filter cartridges in preoperative positions as shown in FIGS. 3c and 4c and displacing and retaining such cartridges in operative positions as shown in FIGS. 3c and 4c.

As best shown in FIG. 5, retainer mechanism 34 includes an elongated shaft 40, a pair of longitudinally spaced arm members 41 and 42 and an eccentrically disposed rod member 43 provided with a pair of spacer collars 44 and 45 and a set of longitudinally spaced arm portions 46, 47 and 48. Shaft 40 is journaled in the lower portions of side walls 13 and 14 within unfiltered air plenum 24, having one end thereof extending outwardly of side wall 13 and provided with a radially disposed operating handle 49, as best shown in FIG. 1. The axis of rotation of shaft 40 lies substantially in a vertical plane including the vertical axis of the outlet openings provided in tube sheet 29. Arm members 41 and 42 are disposed radially relative to the axis of shaft 40 and further are disposed within and adjacent side walls 13 and 14. Rod member 43 is radially displaced from the axis of shaft 40 and is rigidly secured at its ends to radially disposed arm members 41 and 42. Spacer collars 44 and 45 are equally spaced between the ends of arm members 41 and 42 to provide three rod member segments 43a, 43b and 43c which are disposed below the outlet openings in the tube sheet and adapted to engage lower end portions of filter cartridges 31, 32 and 33 respectively. While three filter cartridges are shown, a greater or fewer number filter cartridges may be used depending on, for example, air flow capacity of filter cartridges used. Arm portions 46, 47 and 48 are disposed radially relative to the axis of rod member 43 and are provided with upper seating edges 46a, 47a and 48a which are disposed substantially tangentially relative to rod member 43 and lie in a plane disposed substantially perpendicular or slightly less than 90° relative to a plane passing through the axes of shaft 40 and rod member 43. The arm portions further are provided with lip segments 46b, 47b and 48b projecting perpendicularly relative to the plane of the seating surfaces and being displaced from the plane passing through the axes of shaft 40 and rod member 43 a dimension equal or slightly greater than the radius of one of the filter cartridges. Preferably, the rod member engages a stop member provided in the apparatus so that it assumes the position shown in FIGS. 3a and 3b with the plane passing through the axis of shaft 40 and rod member 43 being disposed substantially horizontally.

As best seen in FIGS. 1 and 3a through 3c, the upper end of the unfiltered air plenum is provided with a set of guide pins 50, 51 and 52 which are spaced inwardly relative to rear wall 17 and depend from the tube sheet, each adjacent one of the outlet openings in the tube sheet. As later will be described, guide pins 51 through 52, and shaft 40 cooperate to seat filter cartridges 31, 32 and 33 in preoperative positions with each of the open upper ends of the filter cartridges disposed below and in registry with an outlet opening in the tube sheet.

Figure 3A:
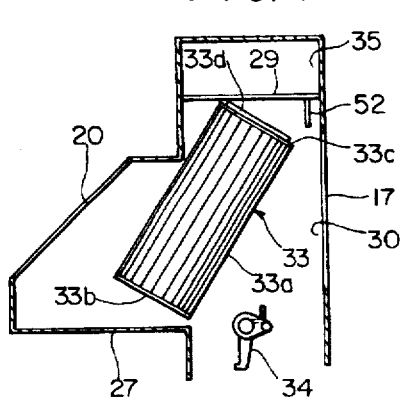
FIG. 3a is a diagrammatic side view of the unit shown in FIGS. 1 and 2, illustrating a filter cartridge being installed in the unit, having been inserted through a front access opening provided by the opened charging door shown in FIG. 2.

Each of filter cartridges 31, 32 and 33 is of a conventional, cylindrical configuration. Referring to FIG. 3a, filter cartridge 33 includes a cylindrical, corrugated filter media section 33a, a closed lower end section 33b and an upper annular section 33c providing a circular opening adapted to register and communicate with an outlet opening in the tube sheet when the filter cartridge is in an operative position, and having an annular sealing gasket 33d. Filter cartridges 31 and 32 are constructed similarly to filter cartridge 33.

Figure 3B:
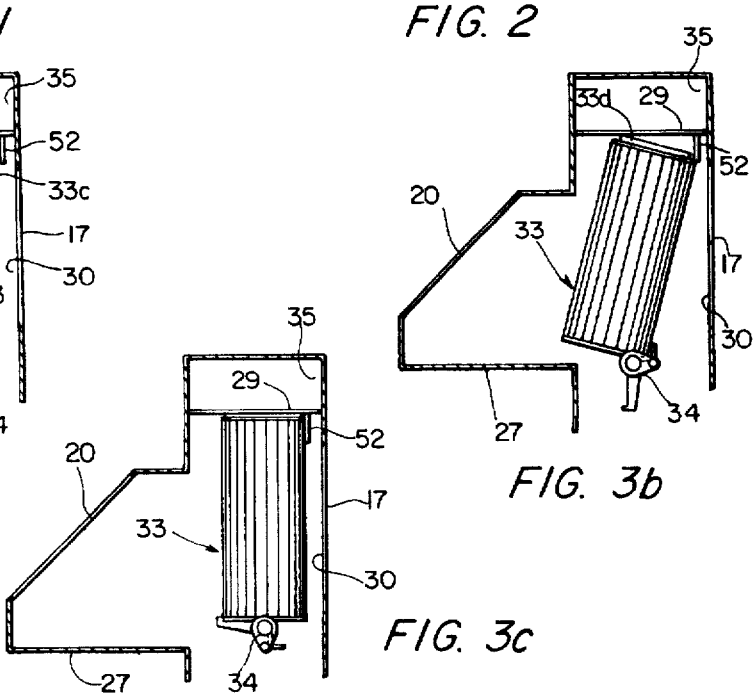
Figure 3C:
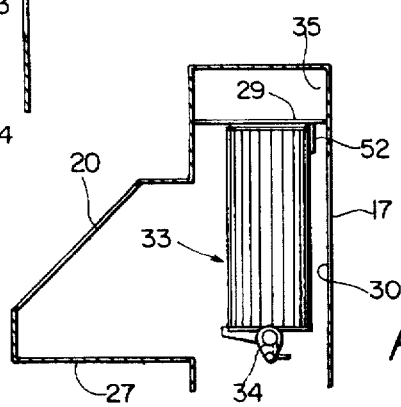
FIG. 3c is a view similar to the views shown in FIGS. 3a and 3b, illustrating the filter cartridge in an operative position sequential to the filter cartridge position shown in FIG. 3b.

FIGS. 3a through 3c illustrate a sequence of positions of filter cartridge 33 being installed in the embodiment of the invention shown in FIGS. 1 and 2, in which the filter cartridges are adapted to be inserted through charging opening 20 and positioned within the unfiltered air plenum. With charging door 21 in the open position as shown in FIG. 2, partition panel 26 either removed or swung outwardly and upwardly and the retainer mechanism in the position as shown in FIG. 3a, filter cartridge 33 may be installed in the filter apparatus by inserting and maneuvering the cartridge through charging opening 20 and into the unfiltered air plenum, swinging the lower end of the cartridge toward rear wall 17 so that an upper portion of filter section 33a thereof engages a guide pin below the tube sheet, and lower cartridge section 33b is positioned above shaft 40 of the retainer mechanism, and then lowering the cartridge to seat on shaft 40 with its open, upper end disposed in registry with an outlet opening in the tube sheet. Such procedure is then repeated until all three of the filter cartridges are supported on shaft 40 of the retainer mechanism with each of the open, upper end sections of the filters being disposed in registry with an outlet opening in the tube sheet. With each of the cartridges thus positioned in their preoperative positions, shaft 40 is rotated approximately 90° by means of handle 49 to cause rod member sections 43a, 43b and 43c to engage the bottom sections of the filter cartridges at cartridge positioning rod pairs 46c, 47c, 48c and displace them upwardly into engagement with the tube sheet as shown in FIG. 3c. As each filter cartridge is displaced upwardly by the camming action of rod member 43, it will be guided into position by one of the guide pins so that the upper opening in the cartridge registers and communicates with an outlet opening in the tube sheet and the annular gasket about such opening engages the tube sheet in sealing relation. In addition, as shaft 40 rotates to cause rod member 43 to cam each cartridge upwardly from a preoperative to operative position, the seating edge of each of arms 46, 47 and 48 will engage and support a lower end section of a cartridge along with a portion of rod member 43, and the lip segment of each arm portion will engage a lower portion of the side wall section of the cartridge to prevent a lateral displacement of the lower end of the cartridge as shown in FIG. 3c.

The various components of the retainer mechanism and the guide pins are positioned and dimensioned so that when each filter cartridge is inserted in the unfiltered air plenum in the preoperational position as described, each of the cartridges will be disposed below the tube sheet with the upper opening therein in registry with an outlet opening in the tube sheet, and when the cartridges are in the operative position as shown in FIG. 3c, the lower end of each cartridge will be supported on a portion of rod member 43 and a seating edge of an arm portion 46, 47 or 48 with a lip segment engaging a side portion of the cartridge, and the outlet opening of the cartridge will communicate with an outlet opening in the tube sheet with the sealing gasket thereof forming a fluid tight seal between the upper annular portion of the cartridge and the tube sheet surrounding the outlet opening in the tube sheet.

As previously mentioned, seating edges 46a, 47a and 48a may lie in a plane disposed slightly less than 90°, perhaps 85°, relative to a plane passing through the axis of shaft 40 and rod member 43 so that upon rotating shaft 40 from the position shown in FIG. 3b to the position shown in FIG. 3c, the axis of rod member 43 will pass slightly over center and thus assure that the rod member will not be caused to swing back down to the position shown in FIG. 3b under the action of the compressed sealing gasket.

Ordinarily, the filter cartridges may be cleaned merely by the periodic injection of pulses of high pressure air through the openings in the tube sheet to provide reverse air flow within the filter media of the cartridges thus dislodge filtered material deposited thereon and causing filtrate to fall through as previously mentioned. However, when a filter cartridge has become worn or damaged, it may be removed by reversing the procedure as described and replaced in such manner. Specifically, it may be removed simply by rotating handle 49 downwardly from the position shown in FIG. 1 to displace the cartridges from their operating positions shown in FIG. 3c to the preoperative positions as shown in FIG. 3b with the lower ends of the cartridges supported on shaft 40, and reaching in through charging opening 20, grasping the lower ends of the cartridges and maneuvering them out through the charging opening. The replacement cartridges may then be inserted and installed in the manner previously described.

Figure 4A:
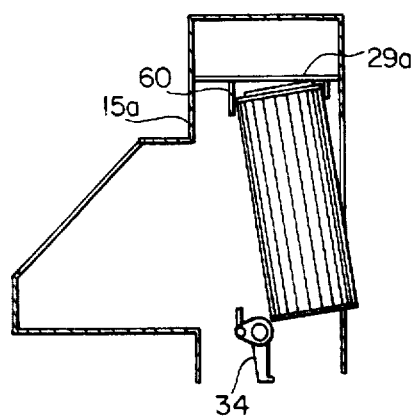
FIG. 4a is a diagrammatic side view of a modification of the unit shown in FIGS. 1 and 2, similar to the view shown in FIG. 3a, illustrating the installation of a filter cartridge in the unit, having been inserted through an access opening in a rear wall of the unit.
Figure 4B:
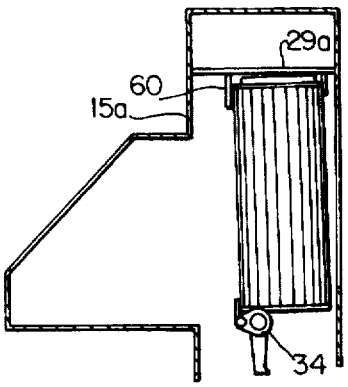
Figure 4C:
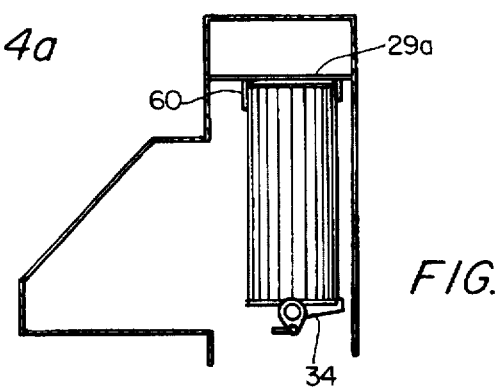

In the type of filter apparatus shown in FIGS. 1 and 2, provided with an access opening in the rear wall thereof, such cartridges may be inserted and removed through such rear access opening as illustrated in FIGS. 4a through 4c. The installation procedure would involve inserting the upper, open end of the filter cartridge first through the rear access opening so that an upper side portion of the cartridge engages a guide pin 60 depending from the tube sheet 29a and spaced from an upper, front wall portion 15a as shown in FIG. 4a, swinging the lower end of the cartridge inwardly until the inner lower end of the cartridge contacts cartridge poisitioning rod pairs as shown in FIG. 4b, and then rotating handle 49 approximately 90° to a position as shown in FIG. 1 to cam the cartridges upwardly so that the upper outlet openings thereof communicate with the outlet openings in the tube sheet and the gaskets disposed on the annular portions of the filter cartridges engage the tube sheet in sealing relation as shown in FIG. 4c. As in the previously described embodiment, with the cartridges in their operative positions as shown in FIG. 4c, the lower ends of the cartridges will be supported on the eccentrically disposed rod member and the upper seating edges of the arm portions of the rod member and the lower ends of the cartridges will be prevented from becoming laterally displaced by the lip segments of such arm portions. Removal of such cartridges again may be accomplished simply by reversing the procedure as described.

Although the retainer mechanism of the aforementioned embodiments has been described as having an eccentrically mounted rod member which is adapted to engage and displace the cartridge members from preoperative to operative positions, it is to be understood that other camming arrangements may be employed to displace such cartridges from preoperative to operative positions. As an example, the displacement means may consist of individual cams configured similar to arm members 41 and 42 which would be adapted to engage and displace the filter cartridges upon rotation of shaft 40. In addition, other suitable means may be employed for firmly supporting the filter cartridges, vertically aligning the cartridges with the openings in the tube sheet when the filter cartridges are in the preoperative positions, and for preventing lateral displacement of the cartridges when in the operative positions. The invention as described further is contemplated for use in any filter apparatus utilizing filter cartridges, other than the type as shown in FIGS. 1 and 2.

From the foregoing detailed description, it will be evident that there are a number of changes, adaptations and modifications of the present invention which come within the province of those having ordinary skill in the art to which the aforementioned invention pertains. However, it is intended that all such variations not departing from the spirit of the invention be considered as within the scope thereof as limited solely by the appended claims.

We claim:

1. A filter apparatus comprising:
   a housing defining an air plenum having an inlet and at least one outlet;
   a filter member having an outlet, disposable within said air plenum in a preoperative position with said outlet thereof in registry with said housing outlet;
   means selectively operable when said filter member is in said preoperative position for displacing said filter member into an operative position with said filter member outlet communicating with said housing outlet and said filter member in sealing engagement with said housing about said housing outlet;
   means engageable by said filter member for guiding said filter member when said filter member is displaced from said preoperative position to said operative position; and
   means for producing an airflow from said housing inlet and through said filter member and said housing outlet whereby airborne particles entrained in airflow drawn through said housing inlet are caused to be removed by said filter member.

2. A filter apparatus according to claim 1 wherein said airflow producing means comprises an impeller having an inlet communicating with said housing outlet.

3. A filter apparatus according to claim 1 wherein said housing includes a partition wall including said housing outlet disposed between said first mentioned air plenum and a clean air plenum.

4. A filter apparatus according to claim 3 wherein said airflow producing means comprises an impeller having an inlet communicating with said clean air plenum.

5. A filter apparatus according to claim 1 including a hopper into which particulate material is charged.

6. A filter apparatus according to claim 1 wherein said filter member includes a compressible element disposed about said outlet therein engageable with said housing in sealing relation when said filter member is urged into engagement with said housing.

7. A filter apparatus according to claim 1 wherein said filter member includes a first end having said outlet, engageable with said housing when said filter member is displaced into said operative position, a second end engageable by said displacing means when said filter member is in said preoperable position and an intermediate filter medium.

8. A filter apparatus according to claim 7 wherein said first end of said filter member includes a compressible sealing element disposed about said outlet therein, engageable with said housing in sealing relation when said filter member is in said operation position.

9. A filter apparatus according to claim 1 wherein said housing includes stop means engageable by said filter member when inserted into said)air plenum and disposed in said preoperative position.

10. A filter apparatus according to claim 1 wherein said displacing means comprises camming means.

11. A filter apparatus according to claim 10, wherein said camming means is disposable in a first position for supporting said filter member in said preoperative position and pivotal to a second position whereby said filter member is caused to be cammed into said operative position.

12. A filter apparatus according to claim 11 wherein said camming means is pivotal to an over-center position causing said camming means to maintain said filter member in said operative position.

13. A filter apparatus according to claim 11 wherein said housing includes stop means engageable by said filter member when inserted into said air plenum and disposed in said preoperative position.

14. A filter apparatus according to claim 11 wherein said camming means includes an arm portion engageable with said filter in supporting relation therewith when said camming means is disposed in said second position having displaced said filter member to said operative position.

15. A filter apparatus according to claim 14 wherein said arm portion includes a lip segment engageable by said filter member when said filter member is in said operative position, precluding displacement of said filter member along a line of travel disposed at an angle relative to a line of travel of said filter member being displaced between said preoperative and operative positions.

16. A filter apparatus according to claim 11 including a shaft member journaled in said housing, supporting said camming means and pivotal about the axis thereof to angularly displace said camming means, causing said camming means to engage and displace said filter member between said preoperative and operative positions.

17. A filter apparatus according to claim 16 including a handle provided on said shaft member for pivoting said shaft member about said shaft member's horizontal axis.

18. A filter apparatus according to claim 1 wherein said displacing means comprises a shaft journaled in said housing pivotal about said shaft member's horizontal axis and a rod member mounted on and disposed eccentrically relative to said shaft member, which is engageable with an end portion of said filter member upon rotation of said shaft member about its axis to displace said filter member between said preoperative and operative positions.

19. A mechanism for retaining a filter member displaceable within an air plenum of a housing between a preoperative position with an outlet thereof spaced from and in registry with an outlet of said housing and an operative position with said outlet of said filter member communicating directly with said housing outlet and a portion of said filter member disposed about the periphery of said outlet therein disposed in sealing engagement with a portion of said housing disposed about the periphery of said housing outlet, comprising:

camming means supported on said housing disposable in a first position for supporting said filter member in said preoperative position and movable from said first position to a second position causing a filter member supported thereon to be displaced to said operative position; and means engagable by said filter member for guiding said filter member when said filter member is displaced from said preoperative position to said operative position.

20. A mechanism according to claim 19 including stop means disposed on said housing engageable, by said filter member when said filter member is supported on said camming means in said preoperative position.

21. A mechanism according to claim 19 wherein said camming means is pivotal between said first and second positions.

22. A mechanism according to claim 21 wherein said camming means is pivotal to an over-center position causing said camming means to maintain said filter member in said operative position.

23. A mechanism according to claim 21 including stop means mounted on said housing and engageable by said filter member when said filter member is supported on said camming means in said preoperative position.

24. A mechanism according to claim 19 wherein said camming means includes an arm portion engageable with said filter member in supporting relation therewith when said camming means is disposed in said second position having displaced said filter member into said operative position.

25. A mechanism according to claim 24 wherein said arm portion includes a lip segment engageable by said filter member when said filter member is in said operative position, precluding displacement of said filter member along a line of travel disposed at an angle relative to a line of travel of said filter member being displaced between said preoperative and operative positions.

26. A mechanism according to claim 19 including a shaft journaled in said housing, supporting said camming means and pivotal to displace said camming means between said first and second positions.

27. A mechanism according to claim 26 including a handle provided on said shaft member for pivoting said camming means.

28. A mechanism according to claim 19 wherein said camming means includes a shaft journaled in said housing and pivotal about an axis thereof, a rod member spaced from and eccentrically disposed relative to said shaft member, engageable with an end portion of said filter member for displacing said filter member between said first and second positions, and means for pivoting said shaft member about its axis.

29. A mechanism according to claim 28 wherein said eccentrically disposed rod member includes an arm portion engageable with said end portion of said filter member when said camming means is in said second position for supporting said filter member.

30. A mechanism according to claim 29 wherein said arm portion includes a lip segment engageable by said filter member when said filter member, is supported on said arm portion in said operative position for precluding lateral displacement of said filter member.

* * * * *